(12) United States Patent
Annapragada et al.

(10) Patent No.: US 10,267,544 B2
(45) Date of Patent: Apr. 23, 2019

(54) ELECTROCALORIC HEAT TRANSFER SYSTEM

(71) Applicant: CARRIER CORPORATION, Jupiter, FL (US)

(72) Inventors: Subramanyaravi Annapragada, South Windsor, CT (US); Andrzej Ernest Kuczek, Bristol, CT (US); Thomas D. Radcliff, Vernon, CT (US); Charles E. Lents, Amston, CT (US); Joseph V. Mantese, Ellington, CT (US); Scott Alan Eastman, Glastonbury, CT (US); Parmesh Verma, South Windsor, CT (US); Wei Xie, East Hartford, CT (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 15/617,796

(22) Filed: Jun. 8, 2017

(65) Prior Publication Data
US 2017/0356680 A1   Dec. 14, 2017

Related U.S. Application Data

(60) Provisional application No. 62/347,592, filed on Jun. 8, 2016.

(51) Int. Cl.
*F25B 21/00*   (2006.01)

(52) U.S. Cl.
CPC ........ *F25B 21/00* (2013.01); *F25B 2321/001* (2013.01)

(58) Field of Classification Search
CPC ...... F25B 21/00; F25B 2321/00; H01L 37/02; Y02B 30/66; Y02T 29/49359

USPC ............................................................ 62/3.1
See application file for complete search history.

(56) References Cited

U.S. PATENT DOCUMENTS

| | | | |
|---|---|---|---|
| 8,371,128 B2 | 2/2013 | Kruglick | |
| 8,695,353 B2 | 4/2014 | Casasanta | |
| 8,739,553 B2 | 6/2014 | Kruglick | |
| 9,109,818 B2 | 8/2015 | Schwartz et al. | |
| 2010/0175392 A1* | 7/2010 | Malloy | F25B 21/00 62/3.2 |

(Continued)

FOREIGN PATENT DOCUMENTS

| | | |
|---|---|---|
| RU | 2075015 C1 | 3/1997 |
| SU | 1560946 A1 | 4/1990 |
| WO | 2015014853 A1 | 2/2015 |

*Primary Examiner* — Davis D Hwu
(74) *Attorney, Agent, or Firm* — Cantor Colburn LLP

(57) ABSTRACT

A heat transfer system cycles between a first mode where a heat transfer fluid is directed to a first electrocaloric module and from the first electrocaloric module to a heat exchanger to a second electrocaloric module while one of the first and second electrocaloric modules is energized, and a second mode where the heat transfer fluid is directed to the second electrocaloric module and from the second electrocaloric module to the heat exchanger to the first electrocaloric module, while the other of the first and second electrocaloric modules is energized. The modes are repeatedly cycled in alternating order directing the heat transfer fluid to cause a temperature gradient in each of the first and second electrocaloric modules, and heat is rejected to the fluid from the heat exchanger or is absorbed by the heat exchanger from the fluid.

16 Claims, 5 Drawing Sheets

(56) References Cited

U.S. PATENT DOCUMENTS

| | | |
|---|---|---|
| 2012/0055174 A1 | 3/2012 | Kruglick |
| 2012/0222427 A1 | 9/2012 | Hassen |
| 2012/0266607 A1 | 10/2012 | Morimoto |
| 2013/0074900 A1* | 3/2013 | Epstein .................. F25B 21/00 136/207 |
| 2014/0020405 A1 | 1/2014 | Kruglick |
| 2014/0345296 A1 | 11/2014 | Defay et al. |
| 2015/0027132 A1 | 1/2015 | Zhang |
| 2015/0033762 A1 | 2/2015 | Cheng et al. |
| 2015/0082809 A1* | 3/2015 | Schwartz ................ F25B 21/00 62/3.1 |
| 2016/0087185 A1 | 3/2016 | Cheng |

\* cited by examiner

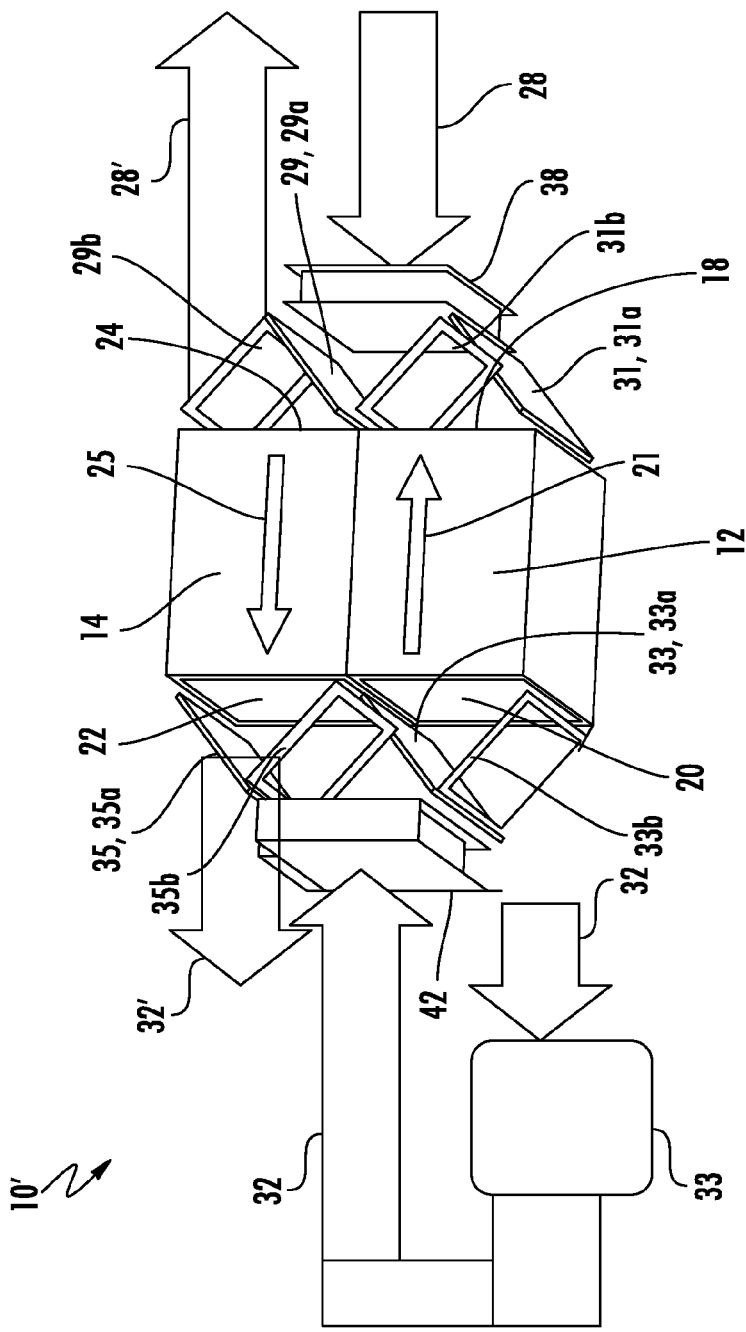

ELECTROCALORIC HEAT TRANSFER SYSTEM

CROSS-REFERENCE TO RELATED APPLICATION

This patent application claims priority to U.S. Provisional Patent Application Ser. No. 62/347,592, filed Jun. 8, 2016, which is incorporated herein by reference in its entirety.

BACKGROUND

A wide variety of technologies exist for cooling applications, including but not limited to evaporative cooling, convective cooling, or solid state cooling such as electrothermic cooling. One of the most prevalent technologies in use for residential and commercial refrigeration and air conditioning is the vapor compression refrigerant heat transfer loop. These loops typically circulate a refrigerant having appropriate thermodynamic properties through a loop that comprises a compressor, a heat rejection heat exchanger (i.e., heat exchanger condenser), an expansion device and a heat absorption heat exchanger (i.e., heat exchanger evaporator). Vapor compression refrigerant loops effectively provide cooling and refrigeration in a variety of settings, and in some situations can be run in reverse as a heat pump. However, many of the refrigerants can present environmental hazards such as ozone depleting potential (ODP) or global warming potential (GWP), or can be toxic or flammable. Additionally, vapor compression refrigerant loops can be impractical or disadvantageous in environments lacking a ready source of power sufficient to drive the mechanical compressor in the refrigerant loop. For example, in an electric vehicle, the power demand of an air conditioning compressor can result in a significantly shortened vehicle battery life or driving range. Similarly, the weight and power requirements of the compressor can be problematic in various portable cooling applications.

Accordingly, there has been interest in developing cooling technologies as alternatives to vapor compression refrigerant loops. Various technologies have been proposed such as field-active heat or electric current-responsive heat transfer systems relying on materials such as electrocaloric materials, magnetocaloric materials, or thermoelectric materials. However, many proposals have been configured as bench-scale demonstrations with limited practical applications.

BRIEF DESCRIPTION

According to some embodiments of this disclosure, an electrocaloric heat transfer system comprises first and second electrocaloric modules. The first electrocaloric module comprises a first electrocaloric element disposed between electrodes, a first port, a second port, and a first fluid flow path between the first port and the second port in thermal communication with the first electrocaloric element. The second electrocaloric module comprises a second electrocaloric element disposed between electrodes, a third port, a fourth port, and a second fluid flow path between the third port and the fourth port in thermal communication with the second electrocaloric element. The system also includes an inlet in fluid communication with and configured to receive fluid from a heat source or heat sink, and in controllable fluid communication with and configured to direct the fluid to the first port or the fourth port. An outlet is disposed in controllable fluid communication with and configured to receive fluid from the first port or the fourth port, and in fluid communication with and configured to discharge the fluid to the heat source or heat sink. A third fluid flow path is disposed between the second port and the third port. The third fluid flow path comprises a heat exchanger in thermal communication with a thermal target.

In any one or combination of the foregoing embodiments, in an operational state wherein the fluid inlet is in communication with and receives fluid from a heat sink, and the third fluid flow path comprises a heat absorption side of the heat exchanger.

In any one or combination of the foregoing embodiments, in an operational state wherein the fluid inlet is in communication with and receives fluid from a heat source, and the third fluid flow path comprises a heat rejection side of the heat exchanger.

In any one or combination of the foregoing embodiments, in an operational state, each of the first and second electrocaloric modules has a thermal gradient along each of the first and second flow paths, respectively.

In any one or combination of the foregoing embodiments, the first electrocaloric module includes a hot side proximate to the first port and a cold side proximate to the second port, and the second electrocaloric module includes a hot side proximate to the fourth port and a cold side proximate to the third port.

In any one or combination of the foregoing embodiments, the heat exchanger in thermal communication with the thermal target is configured to provide fluid at a target inlet temperature at the third or fourth port.

In any one or combination of the foregoing embodiments, the system further comprises a controller configured to alternately energize and de-energize the electrodes of the first and second electrocaloric modules while providing cycled back and forth fluid flow along the first and second fluid flow paths by alternately directing fluid from the fluid inlet to the first port to the second port to the third port to the fourth port to the fluid outlet, or from the fluid inlet to the fourth port to the third port to the second port to the first port to the fluid outlet.

In any one or combination of the foregoing embodiments, the electrodes of the first electrocaloric module are energized when the fluid is directed from the inlet to the fourth port, and the electrodes of the second electrocaloric module are energized when the fluid is directed from the inlet to the first port.

In any one or combination of the foregoing embodiments, the controller is configured to provide the cycled back and forth fluid flow along the first and second flow paths such that each back or forth fluid flow cycle displaces a volume of fluid smaller than the volume of either the first or second flow paths.

In any one or combination of the foregoing embodiments, the system further comprises a three-way valve, or a flow control device selected from two-way shut-off or control valves, flow passage gates, flow passage doors, or pumps in communication with the fluid inlet, the first port, and the fourth port, configured to controllably direct fluid from the inlet to the first port or the fourth port, and from the first port or the fourth port to the outlet.

In any one or combination of the foregoing embodiments, the fluid is a liquid heat transfer compound or composition.

In any one or combination of the foregoing embodiments, the fluid comprises an organic liquid.

In any one or combination of the foregoing embodiments, the fluid comprises an electrically conductive liquid.

In any one or combination of the foregoing embodiments, the fluid comprises an electroactive liquid.

In any one or combination of the foregoing embodiments, the heat exchanger comprises a gas on its heat target side.

In any one or combination of the foregoing embodiments, the heat exchanger comprises a liquid on its heat target side.

In any one or combination of the foregoing embodiments, the heat exchanger comprises a solid on its heat target side.

In any one or combination of the foregoing embodiments, the system comprises electrodes embedded within an electrocaloric film or between electrocaloric adjacent electrocaloric films.

In any one or combination of the foregoing embodiments, the fluid comprises a dielectric organic liquid.

In some aspects of the disclosure, a method of transferring heat comprises
  (a) directing a heat transfer fluid to a first electrocaloric module and from the first electrocaloric module to a heat exchanger to a second electrocaloric module while energizing one of the first and second electrocaloric modules;
  (b) directing the heat transfer fluid to the second electrocaloric module to the heat exchanger to the first electrocaloric module while energizing the other of the first and second electrocaloric modules;
  (c) repeating (a) and (b) in alternating order to cause a temperature gradient in each of the first and second electrocaloric modules; and
  (d) rejecting heat to the fluid from the heat exchanger, or absorbing heat from the fluid by the heat exchanger.

In any one or combination of the foregoing embodiments, the second electrocaloric module is energized in (a) and the first electrocaloric module is energized in (b), and the heat transfer fluid is directed to a heat absorption side of the heat exchanger.

In any one or combination of the foregoing embodiments, the first electrocaloric module is energized in (a) and the second electrocaloric module is energized in (b), and the heat transfer fluid is directed to a heat rejection side of the heat exchanger.

In any one or combination of the foregoing embodiments, an amount of fluid of smaller volume than the fluid volume of either the first and second electrocaloric modules is introduced during each of (a) and (b).

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 3B is a schematic depiction of the heat transfer system in a second mode of operation.

DETAILED DESCRIPTION

Figure 1:
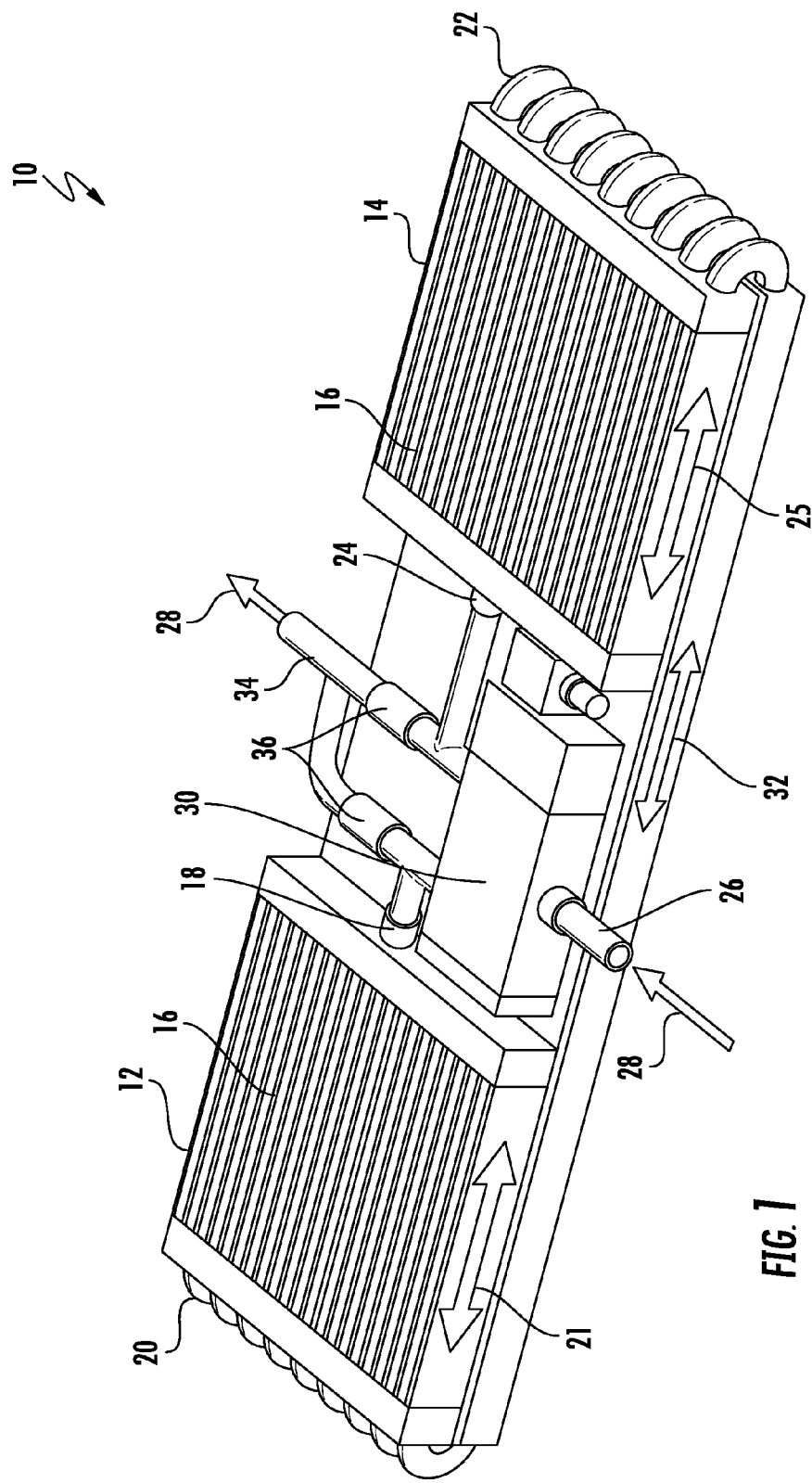
FIG. 1 is a schematic depiction of an example embodiment of a heat transfer system.

With reference now to the Figures, FIG. 1 schematically depicts an example embodiment of a heat transfer system 10.

As shown in FIG. 1, the heat transfer system 10 comprises a first electrocaloric module 12 and a second electrocaloric module 14. Each of the first and second electrocaloric modules 12, 14 includes a stack of electrocaloric elements (e.g., electrocaloric films) 16 disposed between electrodes. Examples of electrocaloric materials for the electrocaloric film can include but are not limited to inorganic materials (e.g., ceramics), electrocaloric polymers, and polymer/ceramic composites. Examples of inorganics include but are not limited to $PbTiO_3$ ("PT"), $Pb(Mg_{1/3}Nb_{2/3})O_3$ ("PMN"), PMN-PT, $LiTaO_3$, barium strontium titanate (BST) or PZT (lead, zirconium, titanium, oxygen). Examples of electrocaloric polymers include, but are not limited to ferroelectric polymers (e.g., Polyvinylidene fluoride and copolymers containing repeat units derived from vinylidene fluoride and other halogenated or non-halogenated addition polymerizable comonomers), liquid crystal polymers, and liquid crystal elastomers.

With continued reference to FIG. 1, the first electrocaloric module 12 includes a first port 18 and a plurality of second ports 20, with a first fluid flow path 21 between the first and second ports and in thermal communication with the electrocaloric elements 12 of the first electrocaloric module 12. The second electrocaloric module 14 includes a plurality of third ports 22 and a fourth port 24, with a second fluid flow path 25 between the third and fourth ports and in thermal communication with the electrocaloric elements 12 of the second electrocaloric module 14. An inlet 26 receives a working fluid 28 from a heat source or heat sink (not shown). Examples of fluids for working fluid 28 include but are not limited to air (including modified air such as oxygen-enriched air (OEA), nitrogen-enriched air (NEA)), other gases (e.g., virtually any industrial process gas), polar or non-polar organic liquids (including dielectric or conductive organic liquids), fuels, electroactive fluids, water, and many other specific examples. Electrically-conductive fluids, including but not limited to inherently conductive fluid compounds or fluids comprising an electrolyte that promotes conductivity (e.g., water comprising a dissolved salt), can utilize appropriate device design configuration to avoid short circuits through the fluid. Example embodiments of a device design to avoid such short circuits is to embed the electrodes within an electrocaloric film or between adjacent electric films to isolate the electrode from the electrically conductive fluid, as disclosed in patent application PCT/US2015/67185, the disclosure of which is incorporated herein by reference in its entirety. Example embodiments of a electrocaloric devices and systems utilizing electroactive liquids are disclosed in patent application PCT/US2014/068497, the disclosure of which is incorporated herein by reference in its entirety. The heat source or heat sink can be a source of fluid at a suitable heat sink/source temperature and having a relatively large thermal mass (e.g., outside ambient air or a large mass of liquid at a suitable temperature), or can be a heat exchanger in thermal communication with a thermal target, such that the heat transfer system sees it as a heat sink or heat source. The fluid 28 is controllably directed by a three-way valve assembly 30 from the inlet 26 to the first electrocaloric module 12 through the first port 18 or to the second electrocaloric module 14 through the fourth port 24. Fluid entering through the inlet 26 displaces fluid in the first or second module 12, 14 onto a third fluid flow path 32 between the third and fourth ports 22 and 24. Of course, a three-way valve is only an example embodiment of modalities that can be used to controllably direct fluid flow between the respective ports, inlet, and outlet, and various other components and configurations can be used, including but not limited to two-way shut-off or control valves, flow passage gates, flow passage doors, other types of flow shut-off or control devices, pumps including fixed flow rate pumps and controllable flow rate pumps, etc.

As will be discussed further below, flow can be in either direction on the first, second, and third fluid flow paths 21, 25, 32 (as indicated by the bi-directional arrow), depending on the position of the three-way valve assembly 30. Fluid displaced from the third fluid flow path 32 flows into the other of the first or second electrocaloric modules 12, 14 (the module not receiving fluid from the inlet 26), from where it exits as working fluid discharge 28' through the first or second port 18, 20 and flows to the heat source or heat sink through the outlet 34. Check valves 36 prevent recirculation of the outgoing fluid back into the other electrocaloric module. The third fluid flow path 32 is in thermal communication with a thermal target (not shown). The thermal target and the thermal connection between it and the thermal flow path 32 can utilize various design configurations. For example, the exterior of conduits providing the third fluid flow path 32 could be fitted with fins and air (as the thermal target) blown across the fins. In another example configuration, the exterior of the third fluid flow path can be configured as a cold plate in heat conductive contact with a thermal target such as electronic component(s). In another example configuration, the conduits providing the third fluid flow path 32 can form one side of a heat exchanger (not shown) in thermal communication with another side of the heat exchanger having a fluid (e.g., heat transfer liquid) flowing that transmits heat through conduits to or from a remote thermal target.

In operation, the system operates the first and second electrocaloric modules 12, 14 out of sync in an internal heat regenerative mode, as described in more detail below. In this mode, one of the electrocaloric modules operates in a regeneration mode absorbing heat from the working fluid with the electrodes de-energized, while the other electrocaloric module operates in an active mode transferring heat to the working fluid with the electrodes energized. The system is operated such that each of the electrocaloric modules alternately shifts between regeneration mode and active mode, with synchronization of the fluid flow. Fluid flow is synchronized with the operational states to provide a back and forth flow pattern along the first, second, and third fluid flow paths so that each of the first and second modules provides a regeneration-enhanced temperature lift.

A non-limiting example embodiment of the operation of the system in a cooling mode is described below with respect to FIGS. 2A and 2B. Example fluid temperatures suitable for a heat transfer application at temperate ambient conditions are referenced below to assist in understanding of the operation of the system, however, it should be understood that these temperatures are used for illustrative purposes only and other temperatures can be utilized depending on system design parameters and target application. Reference numerals from FIG. 1 are carried forward into FIGS. 2A and 2B and have the same meaning as in FIG. 1, so their description is not repeated below.

Figure 2A:
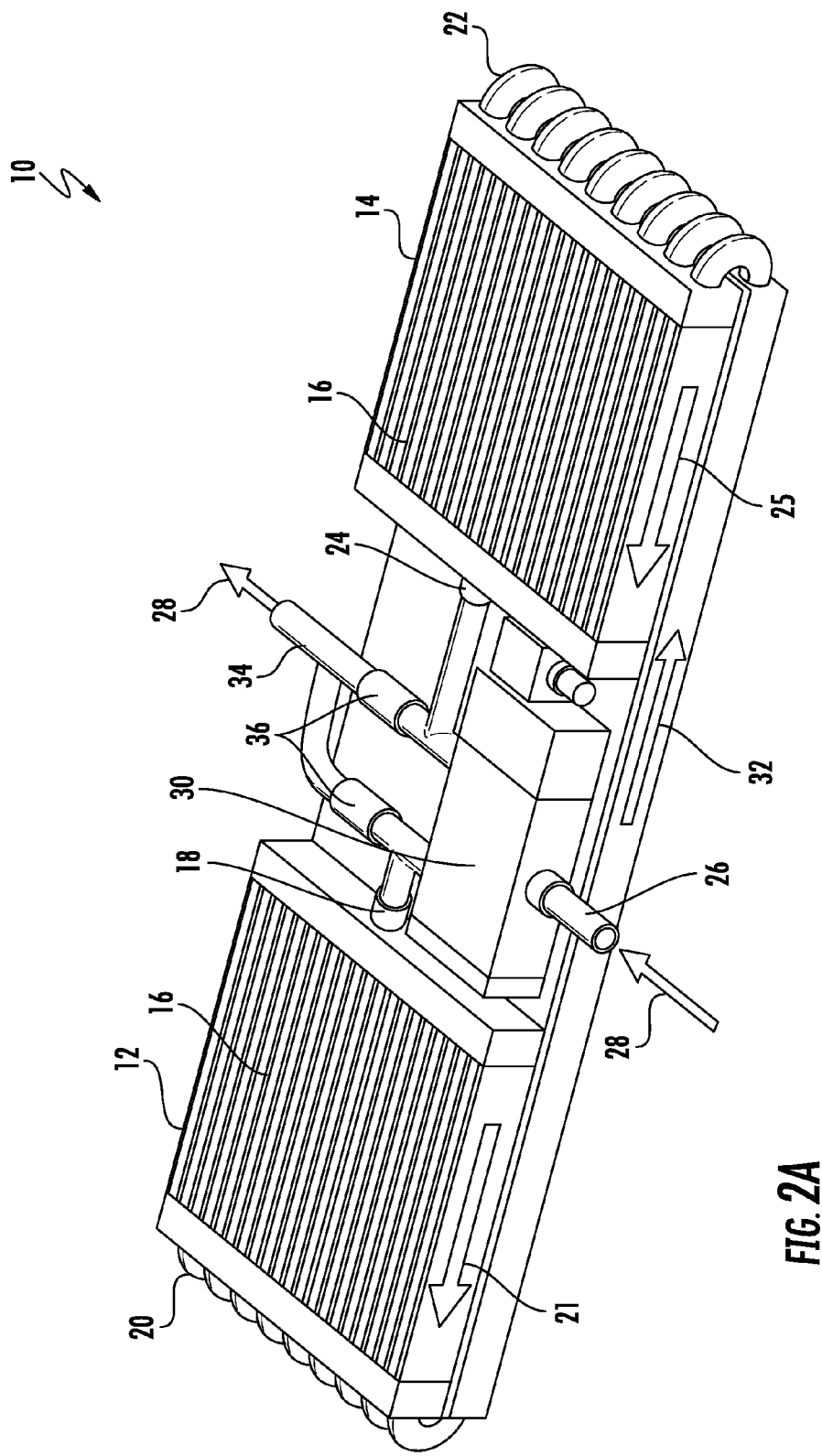
FIG. 2A is a schematic depiction of an example embodiment of a heat transfer system in a first mode of operation.

As shown in FIG. 2A, the system can operate in a first mode where working fluid 28 enters the inlet from a heat sink (e.g., a heat exchanger in thermal contact with a heat sink such as an outdoor ambient environment). The working fluid is directed by the three-way valve assembly 30 to port 18 of the first electrocaloric module 12 which is in regenerative mode with the electrodes de-energized. As an illustrative example, the temperature of the working fluid 28 can be at about 80° F. In regenerative mode with the electrodes de-energized, the electrocaloric material experiences an increase in entropy compared to a prior active mode state, and a concomitant drop in temperature (assuming adiabatic conditions). Heat is transferred from the relatively warm working fluid along the first fluid flow path 21 to the relatively cold electrocaloric elements 16, resulting in a drop in temperature of the working fluid from about 80° F. at the port 18 to about 55° F. at the ports 20. The working fluid then flows along the third fluid flow path 32, where it absorbs heat from the relatively warmer thermal target (cooling the target), resulting in an increase in the fluid temperature from about 55° F. at the ports 20 to about 60° F. at the ports 22 where it enters the second electrocaloric module 14. In this first operational mode, the second electrocaloric module 14 is in active mode with the electrodes energized. In active mode with the electrodes energized, the electrocaloric material experiences a decrease in entropy compared to a prior regenerative mode state, and a concomitant increase in temperature (assuming adiabatic conditions). Heat is transferred from the relatively warm electrocaloric elements 16 to the relatively cold working fluid along the second fluid flow path 25, resulting in an increase in temperature of the working fluid from about 60° F. at the ports 22 to about 85° F. at the port 24. This removal of heat from the electrocaloric elements prepares the electrocaloric elements for the next regenerative cycle where removal of the electric field results in a temperature drop (assuming adiabatic conditions) for the electrocaloric material.

Figure 2B:
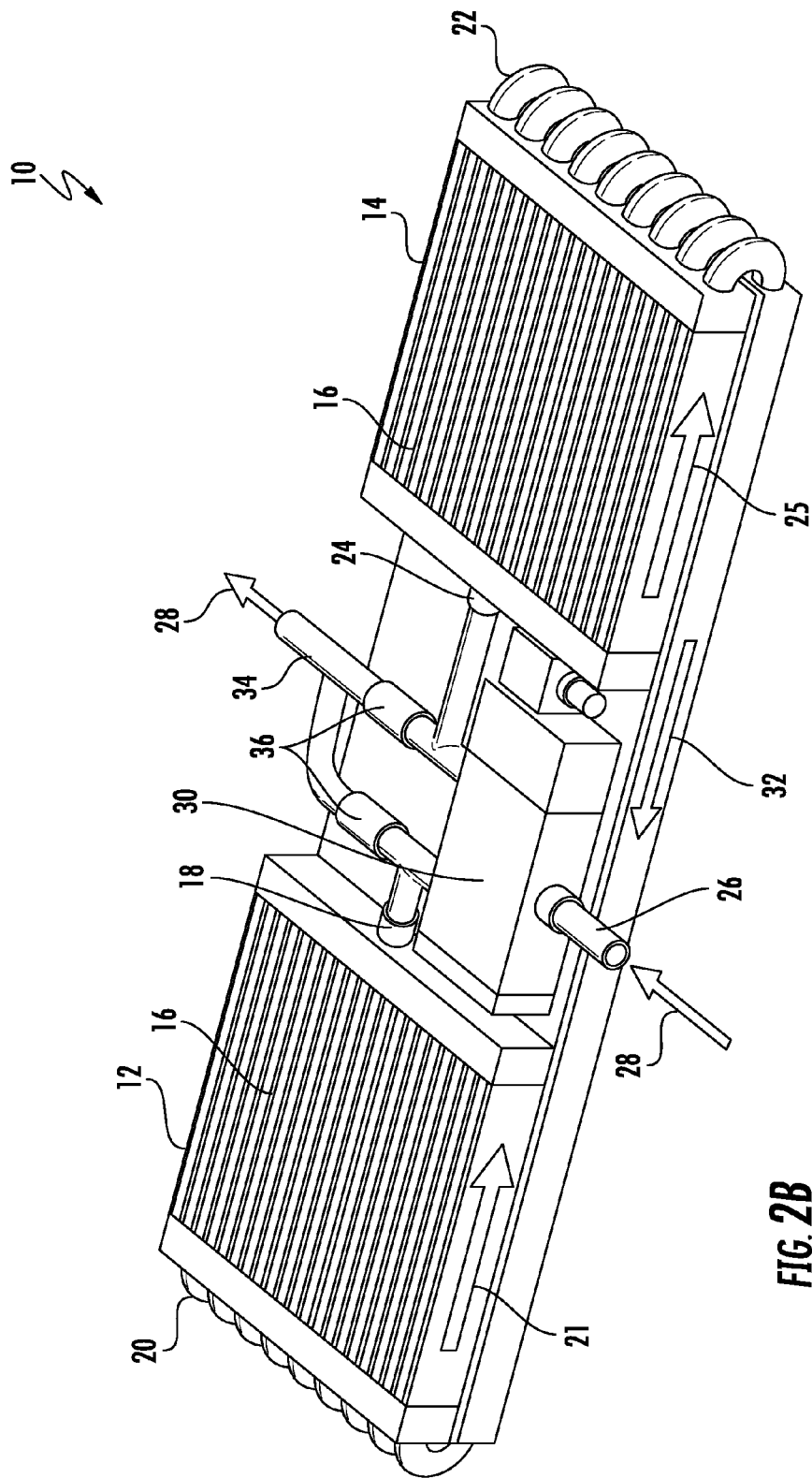
FIG. 2B is a schematic depiction of the example embodiment of a heat transfer system in a second mode of operation.

As shown in FIG. 2B, the system can operate in a second mode where working fluid 28 enters the inlet from a heat sink (e.g., a heat exchanger in thermal contact with a heat sink such as an outdoor ambient environment). The working fluid is directed by the three-way valve assembly 30 to the port 24 second electrocaloric module 14 which is in regenerative mode with the electrodes de-energized. As with the first mode, the temperature of the working 28 can be at about 80° F. In regenerative mode with the electrodes de-energized, the electrocaloric material experiences an increase in entropy compared to a prior active mode state, and a concomitant drop in temperature (assuming adiabatic conditions). Heat is transferred from the relatively warm working fluid along the second fluid flow path 25 to the relatively cold electrocaloric elements 16, resulting in a drop in temperature of the working fluid from about 80° F. at the port 24 to about 55° F. at the ports 22. The working fluid then flows along the third fluid flow path 32, where it absorbs heat from the relatively warmer thermal target (cooling the target), resulting in an increase in the fluid temperature from about 55° F. at the ports 22 to about 60° F. at the ports 20 where it enters the first electrocaloric module 12. In this second operational mode, the first electrocaloric module 14 is in active mode with the electrodes energized. In active mode with the electrodes energized, the electrocaloric material experiences a decrease in entropy compared to a prior regenerative mode state, and a concomitant increase in temperature (assuming adiabatic conditions). Heat is transferred from the relatively warm electrocaloric elements 16 to the relatively cold working fluid along the first fluid flow path 21, resulting in an increase in temperature of the working fluid from about 60° F. at the ports 20 to about 85° F. at the port 18. This removal of heat from the electrocaloric elements prepares the electrocaloric elements for the next regenerative cycle where removal of the electric field results in a temperature drop (assuming adiabatic conditions) for the electrocaloric material.

Figure 3A:
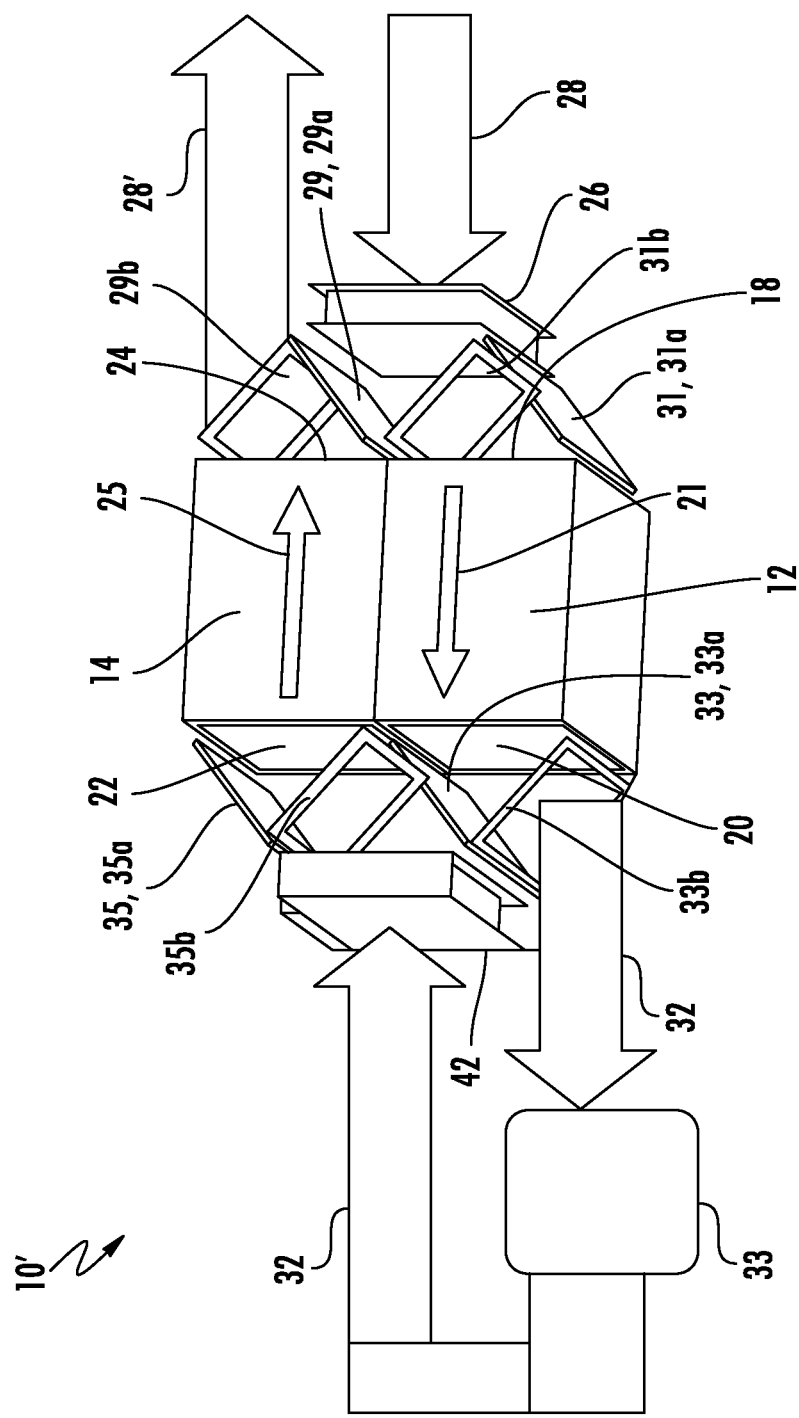
FIG. 3A is a schematic depiction of another example embodiment of a heat transfer system in a first mode of operation.

As mentioned above, the system 10 depicted in FIGS. 1, 2A, and 2B is an example embodiment of a configuration for a heat transfer system; other configurations can also be utilized. Another example embodiment of a configuration for a heat transfer system is schematically depicted in FIGS. 3A and 3B. Example fluid temperatures suitable for a heat transfer application at temperate ambient conditions are referenced below to assist in understanding of the operation of this system, however, it should be understood that these temperatures are used for illustrative purposes only and other temperatures can be utilized depending on system design parameters and target application. Reference numerals from FIGS. 1, 2A, and 2B are carried forward into FIGS. 3A and 3B and have the same meaning as in FIGS. 1, 2A, and 2B so their description is not necessarily repeated below.

As shown in FIG. 3A, the system can operate in a first mode where fluid 28 (e.g., outside air) enters the inlet from a heat sink through a fan 38. The air is directed from the fan 38 by the flapper doors 29, 31 in positions 29a, 31a to port 18 of the first electrocaloric module 12 which is in regenerative mode with the electrodes de-energized. As an illustrative example, the temperature of the outside air can be at about 82° F. and can flow at a relative mass flow rate of 4 ṁ. In regenerative mode with the electrodes de-energized, the electrocaloric material experiences an increase in entropy compared to a prior active mode state, and a concomitant drop in temperature (assuming adiabatic conditions). Heat is transferred from the relatively warm air along the first fluid flow path 21 to the relatively cold electrocaloric elements, resulting in a drop in temperature of the air from about 82° F. at the port 18 to about 55° F. at the port 20. The air is directed from port 20 by the doors 33, 35 in the 33a, 35a position along the third fluid flow path 32 to a heat rejection side of a heat exchanger 37, where it rejects heat to a heat absorption side (not shown), which can be a solid (e.g., electronic component in conductive heat contact with fluid conduit structures for the heat rejection side), or a gas or liquid fluid (e.g., air, water, liquid fuel, etc.) in contact with external conduits structures (e.g., exterior tube or plate surfaces or fin structures). The fluid from the third fluid flow path 32 rejects heat in the heat exchanger 37, resulting in a fluid exiting the heat exchanger along the third fluid flow path 32 at about 60° F., which it is assisted by fan 42 and directed to port 22 where it enters the second electrocaloric module 14. In this first operational mode, the second electrocaloric module 14 is in active mode with the electrodes energized. In active mode with the electrodes energized, the electrocaloric material experiences a decrease in entropy compared to a prior regenerative mode state, and a concomitant increase in temperature (assuming adiabatic conditions). Heat is transferred from the relatively warm electrocaloric elements to the relatively cold air along the second fluid flow path 25, resulting in an increase in temperature of the air from about 60° F. at the port 22 to about 88° F. at the port 24. This removal of heat from the electrocaloric elements prepares the electrocaloric elements for the next regenerative cycle where removal of the electric field results in a temperature drop (assuming adiabatic conditions) for the electrocaloric material.

As shown in FIG. 3B, the system can operate in a second mode where outside air is directed from fan 38 by the flapper doors 29, 31 in positions 29b, 31b to port 24 of the second electrocaloric module 14 which is in regenerative mode with the electrodes de-energized. As an illustrative example, the temperature of the outside air can be at about 82° F. and can flow at a relative mass flow rate of 4 ṁ. In regenerative mode with the electrodes de-energized, the electrocaloric material experiences an increase in entropy compared to a prior active mode state, and a concomitant drop in temperature (assuming adiabatic conditions). Heat is transferred from the relatively warm air along the second fluid flow path 25 to the relatively cold electrocaloric elements, resulting in a drop in temperature of the air from about 82° F. at the port 24 to about 55° F. at the port 22. The air is directed from the port 22 by the doors 33, 35 in the 33b, 35b position along the fluid flow path alternate route 32' to the heat rejection side of heat exchanger 37, where it rejects heat to the heat absorption side (not shown). The fluid from the third fluid flow path 32 rejects heat in the heat exchanger 37, resulting in a fluid exiting the heat exchanger along the third fluid flow path 32 at about 60° F., which is directed to the fan 42, where doors 33, 35 in the 33b, 35b position direct the air to port 20 where it enters the first electrocaloric module 12. In this second operational mode, the first electrocaloric module 12 is in active mode with the electrodes energized. In active mode with the electrodes energized, the electrocaloric material experiences a decrease in entropy compared to a prior regenerative mode state, and a concomitant increase in temperature (assuming adiabatic conditions). Heat is transferred from the relatively warm electrocaloric elements to the relatively cold air along the first fluid flow path 21, resulting in an increase in temperature of the air from about 60° F. at the port 20 to about 88° F. at the port 18. This removal of heat from the electrocaloric elements prepares the electrocaloric elements for the next regenerative cycle where removal of the electric field results in a temperature drop (assuming adiabatic conditions) for the electrocaloric material.

The systems 10, 10' can be operated in either cooling mode as described above, or in a heating or heat pump mode. In both modes, the electrocaloric modules are alternately cycled out of sync between an active mode where the electrodes are energized and a regeneration mode where the electrodes are de-energized. In the cooling mode, the first electrocaloric module 12 has a hot side proximate to port 18 and a cold side proximate to ports 20, and the second electrocaloric module 14 has a hot side proximate to port 24 and a cold side proximate to ports 22. In the cooling mode, the working fluid 28 is directed from a heat sink to the electrocaloric module in regeneration mode, with flow proceeding from the regenerating electrocaloric module to the third fluid flow path 32 where it absorbs heat from and cools the thermal target, to the active electrocaloric module from which it flows through the outlet 34 back to the heat sink. In the heat pump mode, the first electrocaloric module 12 has a cold side proximate to port 18 and a hot side proximate to ports 20, and the second electrocaloric module 14 has a cold side proximate to port 24 and a hot side proximate to ports 22. In the heat pump mode, the working fluid 28 is directed from a heat source to the electrocaloric module in active mode, with flow proceeding from the active electrocaloric module to the third fluid flow path 32 where it rejects heat to the thermal target, to the regenerating electrocaloric module from which it flows through the outlet 34 back to the heat sink.

As mentioned above, the embodiments depicted in FIGS. 1, 2A, 2B, 3A, and 3B are example embodiments, and other configurations can be utilized. For example, each of the Figures depicts two electrocaloric elements 12 and 14; however, other configurations can utilize multiple electrocaloric elements in parallel with either or both of the first and second elements 12 and 14, in common fluid communication with the inlet, outlet, heat sink/source, and third fluid flow path through flow collection and distribution structures (not shown) such as manifolds, headers or plenums. Multiple systems can also be networked together. For example, a plurality of systems 10 or 10' could be configured with heat exchangers on the third fluid flow path configured as cold plates, which could be disposed in contact with a thermal target (e.g., electronic component) at different locations on the target. The networked systems, each with its own third fluid flow path, could have separate working fluid flow paths to and from the heat sink/source or they could share a common flow path in parallel through flow control devices (e.g., manifolds, headers, plenums) as described above.

In some embodiments, the electrocaloric modules 12, 14 are operated in an internal regenerative mode. In an internal regenerative mode, only a portion of the total volume of working fluid in each of the respective first and second flow paths 21, 25 is displaced during each cycle of the alternating cycles of activation and regeneration. This allows heat from the activation cycles retained by fluid internal to the first or second flow path that was not displaced during the active cycle to provide heat to the electrocaloric material during the regenerative cycle. With repetition of cycles where each electrocaloric module experiences a back and forth partial displacement of fluid for each active/regenerative cycle, such internal regeneration can provide a significant temperature gradient (i.e., temperature lift) across the electrocaloric modules between 18 and 20, and between ports 24 and 22. In some embodiments, the system can be configured to provide a target temperature at the ports 22, 24, in order to provide a target temperature to meet the thermal load of a thermal target in thermal communication with the third fluid flow path 32.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An electrocaloric heat transfer system, comprising:
   a first electrocaloric module comprising a first electrocaloric element disposed between electrodes, a first port, a second port, and a first fluid flow path between the first port and the second port in thermal communication with the first electrocaloric element;
   a second electrocaloric module comprising a second electrocaloric element disposed between electrodes, a third port, a fourth port, and a second fluid flow path between the third port and the fourth port in thermal communication with the second electrocaloric element;
   an inlet in fluid communication with and configured to receive fluid from a heat source or heat sink, and in controllable fluid communication with and configured to direct the fluid to the first port or the fourth port;
   an outlet in controllable fluid communication with and configured to receive fluid from the first port or the fourth port, and in fluid communication with and configured to discharge the fluid to the heat source or heat sink;
   a third fluid flow path between the second port and the third port, the third fluid flow path comprising a heat exchanger in thermal communication with a thermal target.

2. The system of claim 1, in an operational state wherein the fluid inlet is in communication with and receives fluid from a heat sink, and the third fluid flow path comprises a heat absorption side of the heat exchanger.

3. The system of claim 1, in an operational state wherein the fluid inlet is in communication with and receives fluid from a heat source, and the third fluid flow path comprises a heat rejection side of the heat exchanger.

4. The system of claim 1, wherein in an operational state, each of the first and second electrocaloric modules has a thermal gradient along each of the first and second flow paths, respectively.

5. The system of claim 4, wherein the first electrocaloric module includes a hot side proximate to the first port and a cold side proximate to the second port, and the second electrocaloric module includes a hot side proximate to the fourth port and a cold side proximate to the third port.

6. The system of claim 5, wherein the heat exchanger in thermal communication with the thermal target is configured to provide fluid at a target inlet temperature at the third or fourth port.

7. The system of claim 1, further comprising a controller configured to alternately energize and de-energize the electrodes of the first and second electrocaloric modules while providing cycled back and forth fluid flow along the first and second fluid flow paths by alternately directing fluid from the fluid inlet to the first port to the second port to the third port to the fourth port to the fluid outlet, or from the fluid inlet to the fourth port to the third port to the second port to the first port to the fluid outlet.

8. The system of claim 7, wherein the electrodes of the first electrocaloric module are energized when the fluid is directed from the inlet to the fourth port, and the electrodes of the second electrocaloric module are energized when the fluid is directed from the inlet to the first port.

9. The system of claim 7, wherein the controller is configured to provide the cycled back and forth fluid flow along the first and second flow paths such that each back or forth fluid flow cycle displaces a volume of fluid smaller than the volume of either the first or second flow paths.

10. The system of claim 1, further comprising a three-way valve, or a flow control device selected from two-way shut-off or control valves, flow passage gates, flow passage doors, or pumps in communication with the fluid inlet, the first port, and the fourth port, configured to controllably direct fluid from the inlet to the first port or the fourth port, and from the first port or the fourth port to the outlet.

11. The system of claim 1, wherein the fluid is a liquid heat transfer compound or composition.

12. The system of claim 11, wherein the fluid comprises an organic liquid.

13. The system of claim 11, wherein the fluid comprises an electrically conductive liquid.

14. The system of claim 11, wherein the fluid comprises an electroactive liquid.

15. The system of claim 1, comprising electrodes embedded within an electrocaloric film or between electrocaloric adjacent electrocaloric films.

16. The system of claim 1, further comprising one or more additional electrocaloric modules individually comprising a pair of ports in controllable fluid communication with either the third fluid flow path or the fluid inlet and fluid outlet the system of claim 14, wherein the one or more additional caloric modules are each configured with a flow path between the pair of ports that is parallel to the first or second flow paths.

* * * * *